(12) United States Patent
Van Ness (10) Patent No.: US 11,330,792 B1
(45) Date of Patent: May 17, 2022

(54) INTERLOCKING MAT TILES USABLE TO FORM CUSTOMIZABLE MAT ASSEMBLIES FOR A CAT LITTER BOX

(71) Applicant: William Van Ness, Clifton, NJ (US)

(72) Inventor: William Van Ness, Clifton, NJ (US)

(73) Assignee: VAN Ness Plastic Molding Company, Inc., Clifton, NJ (US)

( * ) Notice: Subject to any disclaimer, the term of this patent is extended or adjusted under 35 U.S.C. 154(b) by 128 days.

(21) Appl. No.: 16/853,898

(22) Filed: Apr. 21, 2020

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC ............................ A01K 1/0157; A01K 1/0107
See application file for complete search history.

(56) References Cited

U.S. PATENT DOCUMENTS

| | | | | |
|---|---|---|---|---|
| 8,033,249 B1 * | 10/2011 | Cook | ................... | A01K 1/0157 119/165 |
| 9,512,623 B1 * | 12/2016 | Prinz | ................. | E04F 15/02038 |
| 2003/0135947 A1 * | 7/2003 | McKay | ................. | A47L 13/256 15/215 |
| 2015/0059653 A1 * | 3/2015 | Martin | ................. | A01K 1/0107 119/161 |
| 2019/0119862 A1 * | 4/2019 | Penland, Jr | ............... | B32B 3/12 |

FOREIGN PATENT DOCUMENTS

DE          202005018780 U1 *  2/2006  .......... A01K 1/0157

* cited by examiner

*Primary Examiner* — Joshua D Huson
*Assistant Examiner* — Alanna K Peterson
(74) *Attorney, Agent, or Firm* — Thomas A. O'Rourke; Bodner & O'Rourke, LLP (57) ABSTRACT

A tile has interlockable edges for forming a mat assembly customizable for different cat litter box arrangements. The tile includes a rectangular base; prongs; and respective peripheral walls protruding away from the base at its sides. The base also includes: primary male interlocking edge structure on first and third sides, each capable of respectively interlocking with primary female interlocking edge structure on the second and fourth sides, to inhibit relative movement therebetween in a first direction; secondary male interlocking edge structure on the first and third sides, each capable of respectively interlocking with secondary female interlocking edge structure on the second and fourth sides, to inhibit relative movement in a second direction; and tertiary female interlocking edge structure on the first and third sides, each capable of respectively interlocking with tertiary male interlocking edge structure on the second and fourth sides, to inhibit relative movement in a third direction.

14 Claims, 6 Drawing Sheets

INTERLOCKING MAT TILES USABLE TO FORM CUSTOMIZABLE MAT ASSEMBLIES FOR A CAT LITTER BOX

FIELD OF THE INVENTION

This disclosure relates generally to mats used in conjunction with cat litter boxes, and more specifically relates to a mat tile configured to redundantly interlock with one or more other such mat tiles to form a mat assembly customizable for a particular cat litter box arrangement, for use in collecting cat litter granules dropped and/or dislodged from a cat paw when exiting from the cat litter box.

BACKGROUND OF THE INVENTION

Over sixty percent of American households have a pet, and by far the most popular household pets are dogs and cats. For many people, a cat is preferred, as the cat is easily trained to use a litter box, and does not have to be taken outdoors and walked multiple times each day to eliminate waste.

However, the litter on which the cats deposit urine and feces is typically a granulated, moisture-absorbent material. Most cats walk around in the litter box before making use of it, and invariably have granules of the cat litter attached to its four paws when it finally exits the litter box. As the cat's paws initially make contact with the floor, the granules typically are dislodged within the first couple steps, leaving behind the granules and a mess on the floor surrounding the litter box.

For that reason, a number of inventions had been devised that are conceived to collect the granules of cat litter during or after the cat steps out from the litter box. See e.g., U.S. Pat. No. 5,220,886 to Hyde; U.S. Pat. No. 5,797,352 to Ebert; U.S. Pat. No. 6,050,223 to Harris; U.S. Pat. No. 6,109,211 to Tomlinson; U.S. Pat. No. 6,298,808 to Crafton; U.S. Pat. No. 6,302,060 to Schumaier; U.S. Pat. No. 6,357,388 to Holtrop; U.S. Pat. No. 6,386,143 to Link: U.S. Pat. No. 6,684,816 to Lippincott; U.S. Pat. No. 6,983,720 to Lakela; U.S. Pat. No. 7,392,765 to Lingmann; and U.S. Pat. No. 8,033,249 to Cook; and U.S. Patent Application Publication Nos.: 2004/0200425 (Paquette); 2010/0307422 (Huck); 2012/0227672 (Diskin); and U.S. Design Patent Nos.: D518,248 to Northrop; D523,192 to Northrop; D609,411 to Crout; and D612,555 to Kim.

One problem with those inventions is that they are not customizable according to the type of cat litter box utilized (i.e., a deep open "box" as with U.S. Pat. No. 2,971,493 to Robb, permitting egress in each of four directions from the four sides of the box; a covered/hooded box with one opening as with U.S. Pat. No. 5,027,748 to Wolak, permitting egress through the one door/entryway, etc.). Moreover, those inventions are not customizable according to the particular placement of the litter box in the room being utilized (i.e., in the corner of a small room such as a laundry room, permitting egress by the cat in two different directions for the open type box; or up against one wall in the middle of a room such as a game room, permitting egress by the cat in three different directions; or in the middle of an open floor space away from any walls such as a basement, permitting egress by the cat in any one of four different directions).

The disclosure herein is for a particular cat litter floor mat tile configured to redundantly interlock with one or more other such cat litter mat tiles to form a mat assembly customizable for a particular cat litter box type and floor placement. Although interlocking tiles are known for non-analogous uses, such a flooring (see e.g., U.S. Pat. No. 8,925,264 to Thrush), they are complex, and require an excessive amount of dexterity, strength, and manipulation on the part of the pet owner, many of which are elderly people, in order assemble the tiles and disassemble the tiles when needed for cleaning of the cat litter granules therefrom.

The herein disclosed interlockable mat tile includes a new and improved interlocking structure on each of its four edges that quickly and easily permits coupling of multiple tiles together to form any desired shape, which shape may accommodate placement on one side of the cat litter box (e.g., a linear shape), on two sides (e.g., an "L" shaped), on three sides (e.g., a "U" shaped), or even four sides of the cat litter box (e.g., an open square shape).

It is noted that the citing within this disclosure of any patents, published patent applications, and non-patent literature is not an admission as to any of those references constituting prior art with respect to the herein disclosed and claimed apparatus.

OBJECTS OF THE INVENTION

It is an object of the invention to provide a tile usable as a mat to be positioned adjacent to a cat litter box to collect granules of cat litter dislodged from the cat's paws after the cat steps out of the litter box.

It is another object of the invention to provide a tile that may interlock with other such tiles to form a cat litter box mat assembly that is customizable for the particular type of cat litter box utilized, and the particular positioning of the litter box within the room utilized for that purpose.

It is a further object of the invention to provide a tile that may interlock with other such tiles to form a mat assembly for use with a cat litter box, where the mat assembly is customizable to form various different shapes, such as a linear shape, an "L" shape, a "U" shape, etc.

It is another object of the invention to provide a tile that may interlock with other such tiles to form a mat assembly, and which may have interlocking structure that interlocks in three orthogonal directions.

It is also an object of the invention to provide a tile that may quickly and easily interlock with other such tiles to form a mat assembly, and may be quickly and easily disassembled, using a minimum amount of strength and dexterity.

It is another object of the invention to provide a tile that may quickly interlock with other such tiles to form a mat assembly for a cat litter box, which tiles may be easily interconnected by elderly pet owners.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The mat tile disclosed herein is configured to redundantly interlock with one or more other such mat tiles to form a mat assembly customizable for a particular cat litter box arrangement, for use in collecting cat litter grains dropped and/or dislodged from a cat paw when exiting from a cat litter box in one or more different directions according to the particular cat litter box arrangement.

The mat tile may include a base formed into a rectangular shape (e.g., a square shape), with a top surface and bottom surface that extend from a first side of the base to a second side, and from a third side of the base to a fourth side, with the first side being substantially parallel to the second side, and the third side being substantially parallel to the fourth side and substantially perpendicular to the first side. A plurality of prongs may protrude substantially perpendicularly away from the top surface of the base to form a grid pattern of the prongs. A respective peripheral wall may protrude substantially perpendicularly away from the base along each of the first, second, third, and fourth sides of the base.

The mat tile may also include a primary male interlocking edge structure on each of the first and third sides of the base, and a primary female interlocking edge structure on each of the second and fourth sides of the base, each configured such that the primary male interlocking edge structure interlocks with the primary female interlocking edge structure of a second the tile to inhibit relative movement therebetween in a first direction.

The mat tile may also include a secondary male interlocking edge structure on each of the first and third sides of the base, and a secondary female interlocking edge structure on each of the second and fourth sides of the base, each configured such that the secondary male interlocking edge structure interlocks with the secondary female interlocking edge Structure of the second the tile to inhibit relative movement therebetween in a second direction.

The mat tile may also include a tertiary female interlocking edge structure on each of the first and third sides of the base, and a tertiary male interlocking edge structure on each of the second and fourth sides of the base, each configured such that the tertiary male interlocking edge structure interlocks with the tertiary female interlocking edge structure of the second the tile to inhibit relative movement therebetween in a third direction.

The first direction, the second direction, and the third direction are mutually perpendicular to each other, to secure the tiles to each other with respect to inhibiting movement in each direction.

Two of the cat litter mat tiles may be joined to form an interlocked linear-shaped pair of tiles, such that either the primary male interlocking edge structure on the first side of the first tile is interlocked with the primary female interlocking edge structure on the second side of the second tile; or the primary male interlocking edge structure on the third side of the first tile interlocked with the primary female interlocking edge structure on the fourth side of the second tile.

Three or more of the cat litter mat tiles may be joined to form an interlocked L-shaped tile assembly, such that the primary male interlocking edge structure on the first side of the first tile is interlocked with the primary female interlocking edge structure on the second side of the second tile; and the primary male interlocking edge structure on the third side of the first tile is interlocked with the primary female interlocking edge structure on the fourth side of a third tile.

Four of the cat litter mat tiles may be joined to form an interlocked square-shaped tile assembly, such that the primary male interlocking edge structure on the first side of the first tile is interlocked with the primary female interlocking edge structure on the second side of the second tile; the primary male interlocking edge structure on the third side of the first tile is interlocked with the primary female interlocking edge structure on the fourth side of a third tile; and the primary male interlocking edge structure on the first side of the third tile is interlocked with the primary female interlocking edge structure on the second side of a fourth tile, and the primary female interlocking edge structure on the fourth side of the fourth tile is interlocked with the primary male interlocking edge structure on the first side of the second tile.

Five or more of the cat litter mat tiles may be joined to form an interlocked U-shaped tile assembly, such that the primary male interlocking edge structure on the first side of the first tile is interlocked with the primary female interlocking edge structure on the second side of the second tile; the primary male interlocking edge structure on the third side of the first tile is interlocked with the primary female interlocking edge structure on the fourth side of a third tile; the primary male interlocking edge structure on the third side of the third tile is interlocked with the primary female interlocking edge structure on the fourth side of a fourth tile, and the primary male interlocking edge structure on the first side of the fourth tile is interlocked with the primary female interlocking edge structure on the second side of a fifth tile.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator." available at: www.engineersedge.com/calculatorsimachine-design/press-fit/press-fit-calculator.htm).

Any described use of a clearance tit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running tit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder%20Upgrade/fittolerences%20%5BRead-Only%5D.pdf.

The terms "rigid," and "flexible," and "resilient" may be used herein to distinguish characteristics of portions of certain features of the mat tile. Any use of the term "rigid" indicates that the described element is devoid of flexibility such that it does not readily lose its overall shape when force is applied by hand, and in fact it may break if an attempt to bend it is made with sufficient force. Use of the term "flexible" indicates that the described element is capable of repeated bending such that it may be bent into different shapes and does not retain a general shape, but instead readily deforms when force is applied. Use of the term "resilient" indicates that the described element has such flexible features and also has a tendency to return to its initial general shape without permanent deformation once a force that causes such flexure is removed.

FIGS. 1 to 9 illustrate various views and section cuts through a mat tile 100, as disclosed herein. The mat tile 100 disclosed herein is configured to redundantly interlock with one or more other such mat tiles to form a mat assembly customizable for a particular cat litter box arrangement, for use in collecting cat litter grains dropped and/or dislodged from a cat paw when exiting from a cat litter box in one or more different directions according to the particular cat litter box arrangement.

Figures 1, 3, 5:
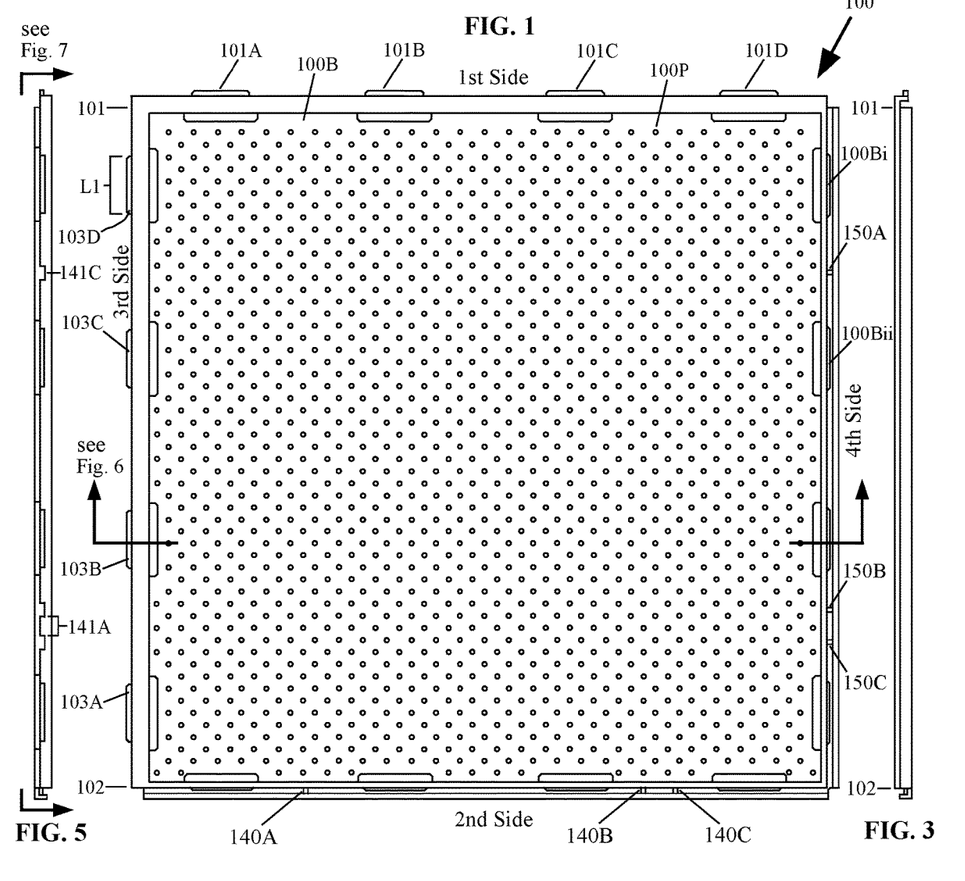
FIG. 1 is a top view of a cat litter mat tile as disclosed herein.
FIG. 3 is a side view of the second side of the cat litter mat tile of FIG. 1.
FIG. 5 is a side view of the fourth side of the cat litter mat tile of FIG. 1.
Figure 2:
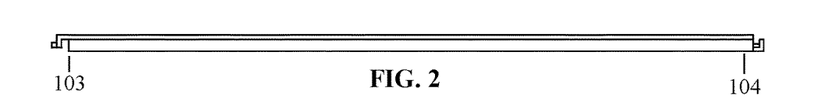
FIG. 2 is a side view of the first side of the cat litter mat tile of FIG. 1.
Figure 4:
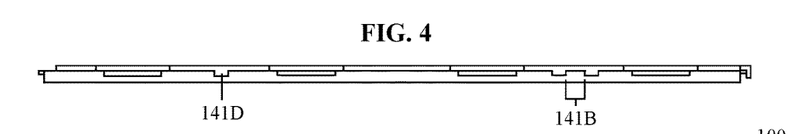
FIG. 4 is a side view of the third side of the cat litter mat tile of FIG. 1.
Figure 6:
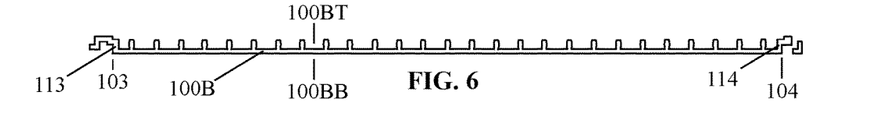
FIG. 6 is a cross-sectional view of the cat litter mat tile of FIG. 1, taken parallel to the tile's first side, and through the respective male and female interlocking edge structure of the third and fourth sides of the tile.
Figures 7, 8, 9:
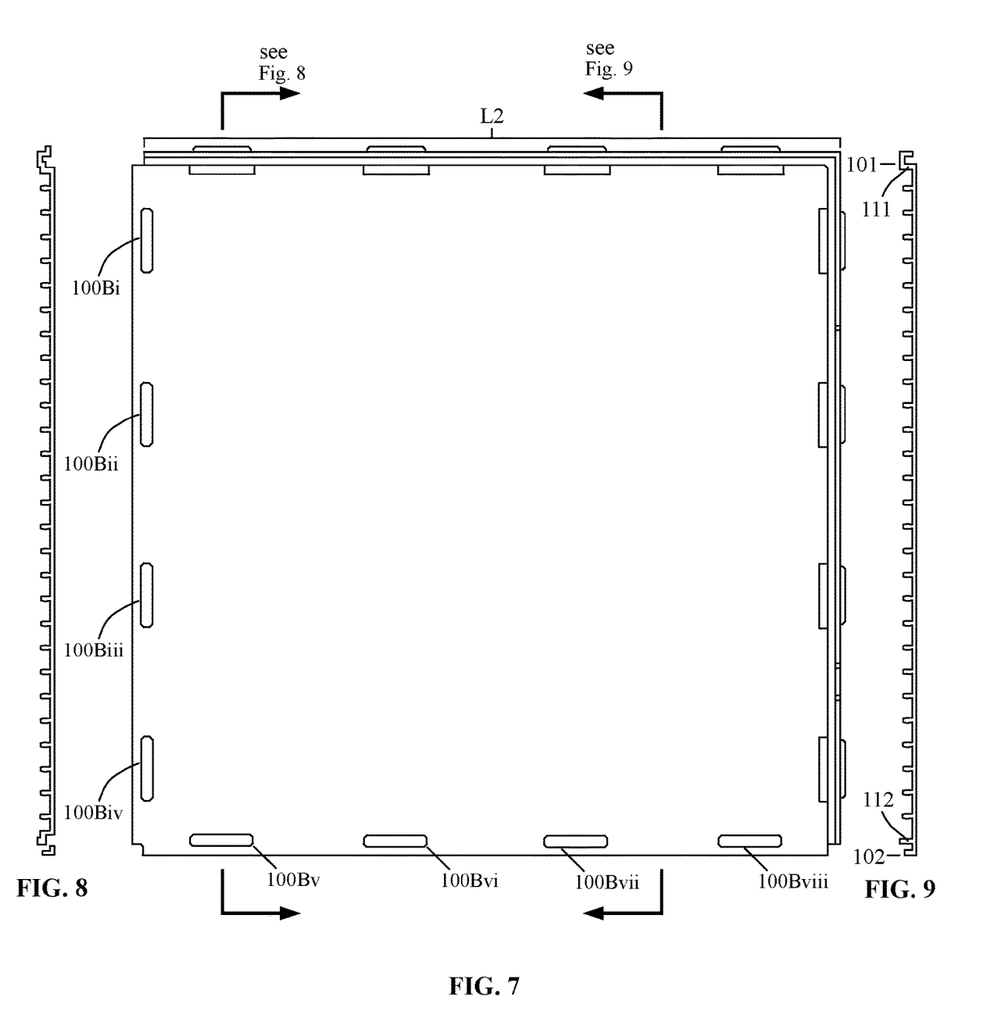
FIG. 7 is a bottom view of the cat litter mat tile of FIG. 1.
FIG. 8 is a cross-sectional view of the cat litter mat tile of FIG. 1, taken parallel to the tile's fourth side, and through the respective male and female interlocking edge structure of the first and second sides of the tile.
FIG. 9 is a cross-sectional view of the cat litter mat tile of FIG. 1, taken parallel to the tile's third side, and through a portion of the respective male and female interlocking edge structure of the first and second sides of the tile.

The mat tile 100 may include a base 100B formed into a rectangular shape (e.g., a square shape), with a top surface 100BT and bottom surface 100BB that extend from a first side 101 of the base to a second side 102, and from a third side 103 of the base to a fourth side 104, with the first side being substantially parallel to the second side, and the third side being substantially parallel to the fourth side and substantially perpendicular to the first side. A plurality of prongs 100P may protrude substantially perpendicularly away from the top surface of the base to form a grid pattern of the prongs. The grid of prongs 100P provide stable support for the cat to walk upon while exiting from the litter box, and also readily permit dislodgment and dropping of the granules from the cat's paws in the spacing between the prongs.

The grain size for cat litter is categorized as: very small, being less than 0.85 mm (0.03 inches); small, being 0.85 mm to 2.2 mm (0.03 inches to 0.09 inches); medium, being 2.2 m to 4.76 mm (0.09 inches to 0.19 inches); large, being 4.76 mm to 8.0 mm (0.19 inches to 0.3 inches); and very large, being greater than 8 mm (0.3 inches); see Physical and Sensory Characteristics of Cat Litter, by Margaret Cliff and Hildegarde Heymann, Journal of Sensory Studies, vol. 6, issue 4. December 1991, p. 255-66.

Accordingly, in one embodiment, the spacing between the prongs 100P may be large enough to accommodate all of the different grain/granule sizes of the different types of cat litter; however, such spacing does not provide very stable support for the cat's paw; moreover, most cats prefer fine grain litter because it feels soft, and as a result, most consumers purchase the very small or small grain sized cat litter, and some purchase the medium sized grain cat litter.

Therefore, in another embodiment the spacing between the prongs 100P may be just slightly larger than the very small grain size (i.e., being about 1 mm or 0.04 inches apart); in yet another embodiment, the spacing between the prongs may be set to be slightly larger than the small grain size (i.e., being about 2.5 mm or 0.10 inches apart); and in a further embodiment, the spacing between the prongs may be set to be slightly larger than the medium grain size (i.e., 5 mm or 0.20 inches apart).

In one embodiment the height of the prongs 100P is between 2/32 of an inch and 5/32 of an inch, and in another embodiment is between 5/32 of an inch and 8/32 of an inch, and in yet another embodiment is between 8/32 of an inch and 12/32 of an inch. Other ranges or a combination of such ranges for the spacing of the prongs 100P may be used in other embodiments. Alternative, the height of the prongs may be set to correspond to the cat litter grain size; thus the height in this embodiment may be the same as the spacing.

The mat tile 100 may also include a first peripheral wall (111) configured to protrude substantially perpendicularly away from the base along the first side of the base; a second peripheral wall (112) configured to protrude substantially perpendicularly away from the base along the second side of the base; a third peripheral wall (113) configured to protrude substantially perpendicularly away from the base along the third side of the base; and a fourth peripheral wall (114) configured to protrude substantially perpendicularly away from the base along the fourth side of the base. The base 100B, the prongs 100P, and the peripheral walls 111, 112, 113, and 114 may all be integrally formed as one single unitary piece (e.g., during an injection molding process), and may be made of any suitable flexible material that is also resilient, including, but not limited to an elastomeric material such as a natural rubber, a synthetic rubber, etc.

The peripheral walls 111, 112, 113, and 114 serve to retain granules deposited/dislodged from the cat's paws on the top surface 100BT of the base 1001) until they can be dumped into a trash receptacle. The peripheral walls 111, 112, 113, and 114 may also serve as part of the interlocking structure on each of the sides 101, 102, 103, and 104 of the mat tile 100.

In one embodiment, the mat tile 100 may include a primary male interlocking edge structure on each of the first and third sides of the base, and a primary female interlocking edge structure on each of the second and fourth sides of the base, each configured such that the primary male interlocking edge structure interlocks with the primary female interlocking edge structure of a second tile to inhibit relative movement therebetween in a first direction.

In another embodiment, the mat tile 100 may also include a secondary male interlocking edge structure on each of the first and third sides of the base, and a secondary female interlocking edge structure on each of the second and fourth sides of the base, each configured such that the secondary male interlocking edge structure interlocks with the secondary female interlocking edge structure of the second tile to inhibit relative movement therebetween in a second direction.

In yet another embodiment, the mat tile 100 may also include a tertiary female interlocking edge structure on each of the first and third sides of the base, and a tertiary male interlocking edge structure on each of the second and fourth sides of the base, each configured such that the tertiary male interlocking edge structure interlocks with the tertiary female interlocking edge structure of the second tile to inhibit relative movement therebetween in a third direction, where the first direction, the second direction, and the third direction are mutually perpendicular to each other.

Figure 10:
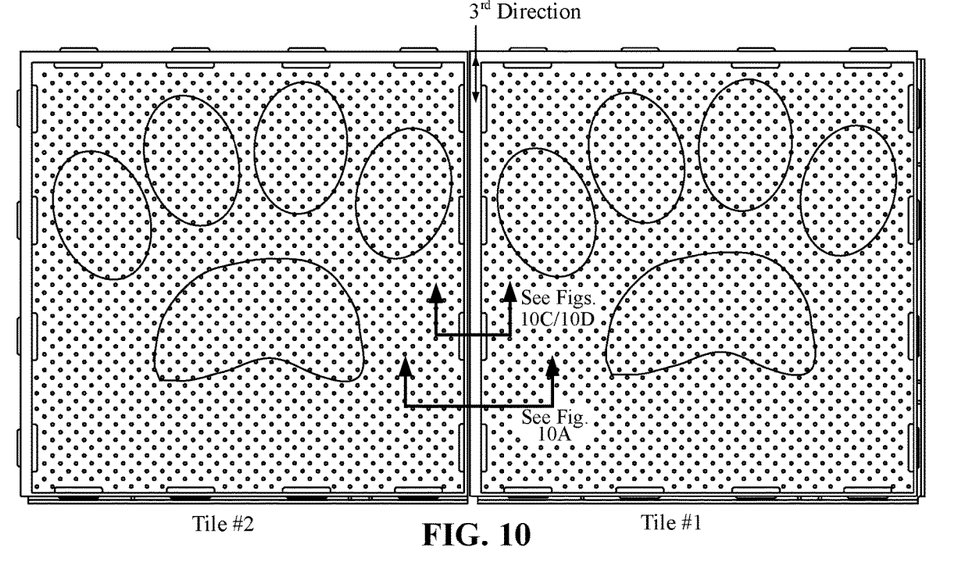
FIG. 10 is the top view of the cat litter mat tile of FIG. 1, shown interlocked with a second such mat tile, with the primary male interlocking edge structure on the third side of the first tile interlocked with the primary female interlocking edge structure on the fourth side of the second tile.

The primary male interlocking edge structure on each of the first side 101 and third side 103 of the base 100B may be formed by a first flange that extends laterally (e.g., perpendicularly) a short distance away from the corresponding peripheral wall (111/113), and a second flange which extends laterally (e.g., perpendicularly) a small distance away from the end of the first flange. These first and second flanges are best seen in FIG. 10B for the tile #1, with the first flange 113i extending away from peripheral wall 113, and the second flange 113ii extending away from the end of the first flange being distal from the base 100B, to form an upside-down "J"-shaped cross-section.

The primary female interlocking edge structure on each of the second side 102 and fourth side 104 of the base 100B may also be formed by a first flange that extends laterally (e.g., perpendicularly) a short distance away from the corresponding peripheral wall (112/114) but from the proximal end being substantially in line with the plane of the base, and a second flange which extends laterally (e.g., perpendicularly) a small distance away from the end of the first flange. These first and second flanges are also best seen in FIG. 10B for the tile #2, with the first flange 114*i* extending away from the end of the peripheral wall 113 being proximal to base 100B and the second flange 114*ii* extending away from the distal end of the first flange, to form a "J"-shaped cross-section.

Figure 10A:
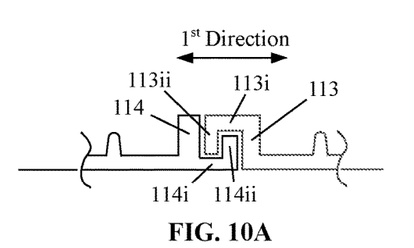
FIG. 10A is an enlarged cross-sectional view through the interlocked tiles of FIG. 10, showing the interlocking arrangement of the primary male interlocking edge structure on the third side of the first tile with the primary female interlocking edge structure on the fourth side of the second tile to inhibit relative movement therebetween in a first direction.
Figure 10B:
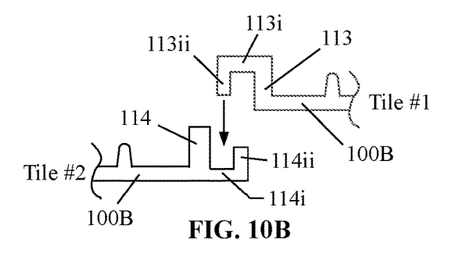
FIG. 10B is the enlarged cross-sectional view of FIG. 10A, but shown prior to the first tile being interlocked with the second tile.

The upside-down "J"-shaped primary male interlocking edge structure on each of those sides 101 and 103 is thus configured to interlock with the "J"-shaped primary female interlocking edge structure on each of the sides 102 and 104, as seen in FIG. 10A, in which the flange 113*ii* of the tile #1 is nested between the peripheral wall 114 and second flange 114*ii* of the tile #2 in a small clearance fit. The flange 114*ii* of the tile #2 may similarly be nested between the peripheral wall 113 and second flange 113*ii* of the tile #1 in a small clearance fit.

In one embodiment, the distal end of the flange 113*ii* of the tile #1 may contact the flange 114*i*, at the same time that the distal end of the flange 114*ii* of the tile #2 contacts the flange 113*i*, while the bottom surface 1008B of the two mat tiles remain substantially coplanar while resting on a floor.

In another embodiment, as illustrated in FIG. 10A, which may better enable use of the hereinafter described secondary interlocking edge structure, the distal end of the flange 113*ii* of the tile #1 may terminate to have a small clearance with respect to the side of flange 114*i*, at the same time that the distal end of the flange 114*ii* of the tile #2 may also terminate to have a small clearance with respect to the side of the flange 113*i*, while the bottom surface 100BB of the two mat tiles remain substantially coplanar while resting on a floor.

For either embodiment, as seen in FIG. 10B, the interlocking between those walls tends to inhibit relative movement between those two interlocked tiles (tile #1 and tile no. 2) in a first direction, with that first direction being generally perpendicular to the peripheral walls.

The secondary male interlocking edge structure on each of the first side 101 and third side 103 of the base 100B may be formed of a plurality of flanges that extend laterally (e.g., perpendicularly) a short distance away from the second flange of the primary male interlocking structure. These plurality of flanges may be seen in the top view of FIG. 1, and may include flanges 101A, 101B, 101C, and 101D, and also flanges 103A, 103B, 103C, and 103D. These plurality of flanges, one of which (i.e., flange 103B) may also be seen in FIG. 10C for the tile #1, may be formed to extend away from the distal end of the second flanges of the primary interlocking edge structure (i.e., away from the end of the second flange 11311).

The secondary female interlocking edge structure on each of the second side 102 and fourth side 104 of the base 100B may therefore be an opening that forms a laterally disposed recess (i.e., recess 114R in FIG. 10D) that is configured to receive the correspondingly positioned flange.

The interlocking achieved by the secondary male interlocking edge structure and the secondary female interlocking edge structure tends to inhibit relative movement between those two interlocked tiles (tile #1 and tile no. 2) in a second direction, with that second direction being generally parallel to the short direction of the peripheral walls. Where a fairly small clearance fit is used between the plurality of flanges (i.e., flange 103B) and the recesses (i.e., recess 114R), the interlocking achieved by the secondary male interlocking edge structure and the secondary female interlocking edge structure may also tend to inhibit relative movement between those two interlocked tiles (tile #1 and tile no. 2) in a third direction, with that third direction being generally parallel to the long direction of the peripheral walls (see FIG. 10).

It is preferable to use the plurality of flanges with each having a length L1 (see FIG. 1) to have a total engagement length (i.e., four times the L distance) that may be about one-fourth to about one-third of the linear length L2 (see FIG. 9) of the peripheral wall, to limit the amount of interlocking force that is attained.

Figure 10C:
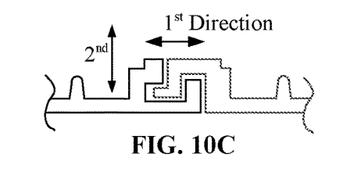
FIG. 10C is an enlarged cross-sectional view through the interlocked tiles of FIG. 10, showing the interlocking arrangement of the primary male interlocking edge structure on the third side of the first tile with the primary female interlocking edge structure on the fourth side of the second tile, and showing the secondary male interlocking edge structure on the third side of the first tile with the secondary female interlocking edge structure on the fourth side of the second tile to inhibit relative movement therebetween in a second direction.
Figure 10D:
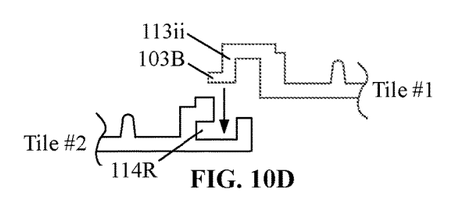
FIG. 10D is the enlarged cross-sectional view of FIG. 10C, but shown prior to the first tile being interlocked with the second tile.
Figure 10E:
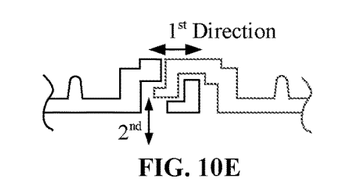
FIG. 10E is an enlarged cross-sectional view through the interlocked tiles of FIG. 10C, but where an additional opening is formed in the bottom surface of the base.
Figure 10F:
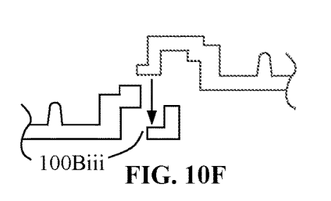
FIG. 10F is the enlarged cross-sectional view of FIG. 10E, but shown prior to the first tile being interlocked with the second tile.

To provide increased local flexibility of the tile 100 at each of the plurality of flanges to more easily permit the interlocking shown in FIGS. 10C to 10D, an opening may be formed in the base 100B proximal to each recess location (i.e., recess 114R in FIG. 10D). As shown for example for opening 100Biii in FIG. 1, FIG. 10F and FIG. 7, a portion of each of those openings may be thru openings.

The tertiary male interlocking edge structure on each of the second side 102 and fourth side 104 of the base 100B may be formed by a flange (e.g., flange 140A, 140B in FIG. 1) that may extend perpendicularly between the peripheral wall and the second flange of the primary female interlocking edge structure, but not being full depth.

The tertiary female interlocking edge structure on each of the first side 101 and third side 103 of the base 100B may be formed by a notch (e.g., notches 141A, 141B in FIG. 5) that may be engaged by the flanges 140A/140B. A series (i.e., 2, 3, 4, or more) of these engaged flanges and corresponding notches may be used along the length of the tile 100.

Alternatively, a side-by-side double flange arrangement may be used (e.g., flanges 140B/140C and also flanges 150B and 150C), and rather than a notch that would engage each flange, a pair of openings may form a tang on each of the first side 101 and third side 103 (e.g., tang 141C and 141D).

The tertiary interlocking edge structure may also tend to inhibit relative movement between those two interlocked tiles (tile #1 and tile no. 2) in the third direction.

The herein disclosed interlocking is only intended to prevent a small cat from separating the tiles by scratching at them, and to permit the pet owner to carefully move the interlocked and particularly arranged tile assembly about to properly position it/them with respect to the cat litter box. The interlocking is not intended to prohibit an elderly person from easily pulling the tiles apart; thus the resiliency of the material utilized and thickness and clearances are also coordinated such that the tiles will not pull apart under its own weight, or under the weight of 3-4 tiles, and in one embodiment may require a force of one-half of a pound to one pound to cause separation of two tiles; and in another embodiment may require a force of 1-2 pounds to cause separation, and in yet another embodiment, may require a force of 3-4 pounds to cause separation of two tiles. Other separation forces or a combination of such separation forces may be used in other embodiments.

To assist the pet owner in properly joining the tiles, because of the directionality inherent with three different sets of interlocking structure, each tile may have an instructional marking inked or molded onto the tiles to identify proper orientation for achieving interlocking. For example, as seen in FIG. 10, a cat paw may be formed on the top surface 100BT of the tile 100, which may indicate that each of the tiles may be assembled when so oriented.

As seen in FIG. 10, two of the cat litter mat tiles 100 may be joined to form an interlocked linear-shaped pair of tiles, such that either the primary male interlocking edge structure on the first side of the first tile is interlocked with the primary female interlocking edge structure on the second side of the second tile; or the primary male interlocking edge structure on the third side of the first tile interlocked with the primary female interlocking edge structure on the fourth side of the second tile.

Figure 12:
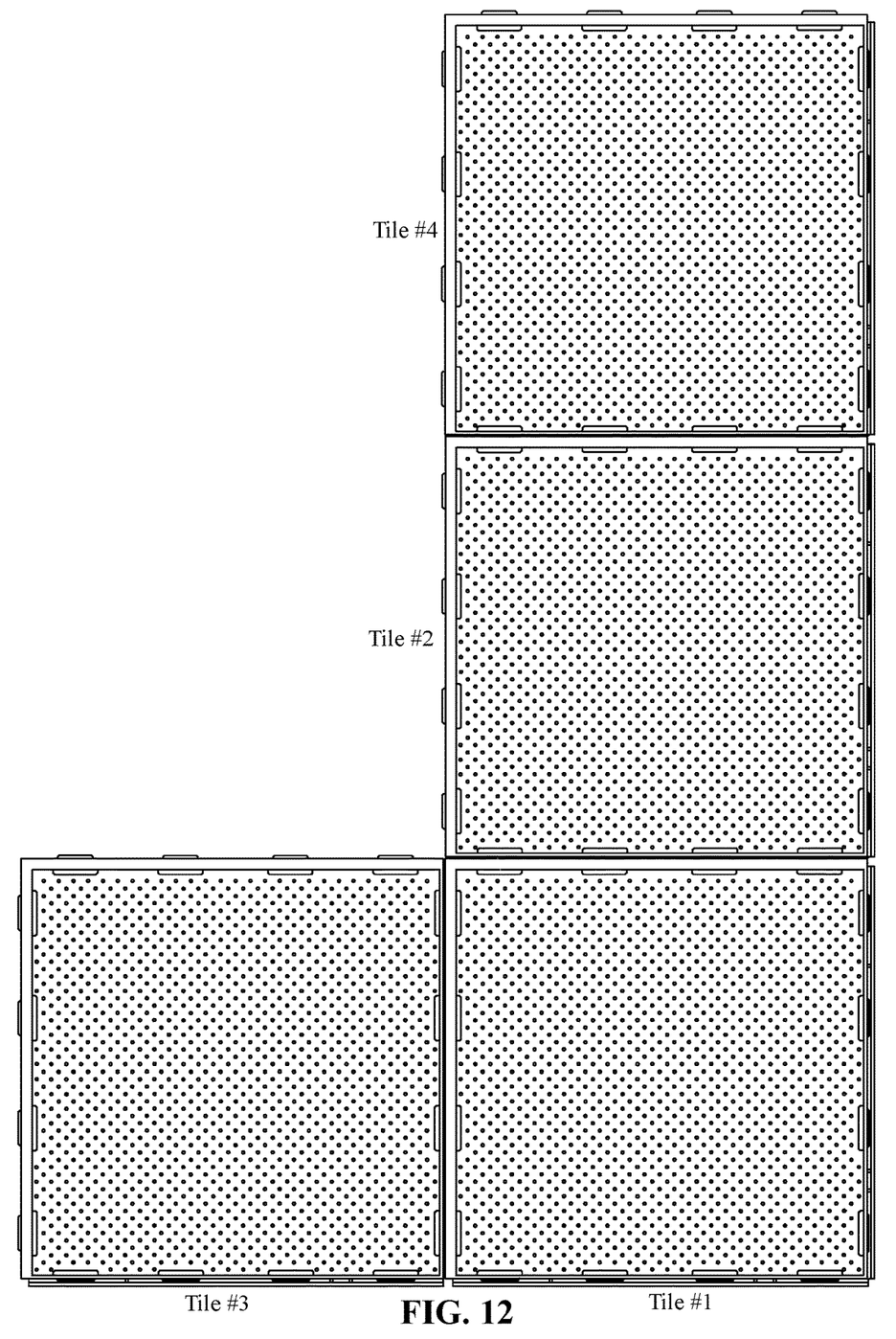
FIG. 12 is the top view of the cat litter mat tile of FIG. 1, shown interlocked with a second such mat tile, and a third such mat tile, and with the second mat tile interlocked with a fourth such mat tile to form an interlocked L-shaped tile assembly of four tiles.

As seen in FIG. 12, three or more of the cat litter mat tiles 100 may be joined to form an interlocked L-shaped tile assembly, such that the primary male interlocking edge structure on the first side of the first tile is interlocked with the primary female interlocking edge structure on the second side of the second tile; and the primary male interlocking edge structure on the third side of the first tile is interlocked with the primary female interlocking edge structure on the fourth side of a third tile.

Figure 11:
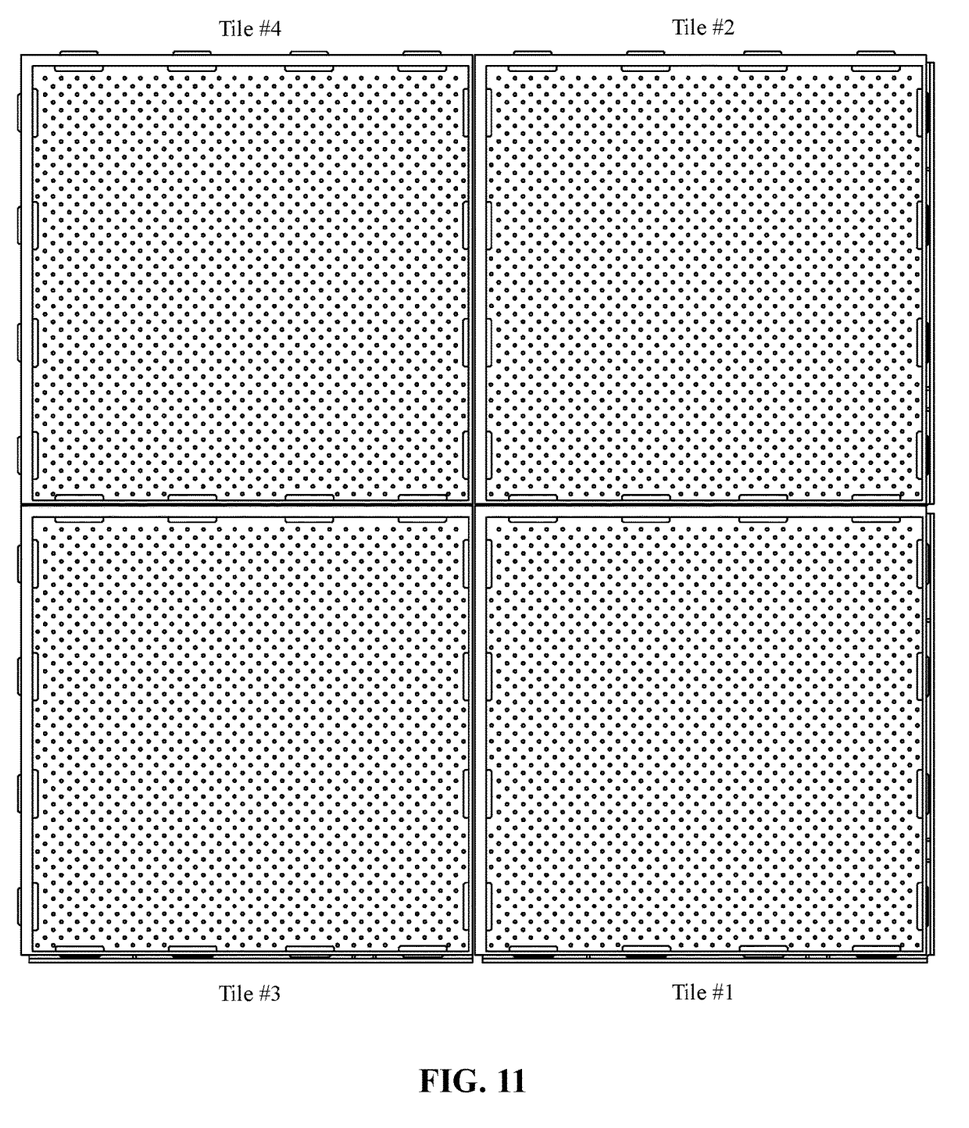
FIG. 11 is the top view of the cat litter mat tile of FIG. 1, shown interlocked with a second such mat tile, and a third such mat tile, and with the second and third mat tiles interlocked with a fourth such mat tile to form an interlocked square-shaped tile assembly of four tiles.

As seen in FIG. 11, four of the cat litter mat tiles 100 may be joined to form an interlocked square-shaped tile assembly, such that the primary male interlocking edge structure on the first side of the first tile is interlocked with the primary female interlocking edge structure on the second side of the second tile; the primary male interlocking edge structure on the third side of the first tile is interlocked with the primary female interlocking edge structure on the fourth side of a third tile; and the primary male interlocking edge structure on the first side of the third tile is interlocked with the primary female interlocking edge structure on the second side of a fourth tile, and the primary female interlocking edge structure on the fourth side of the fourth tile is interlocked with the primary male interlocking edge structure on the first side of the second tile.

Figure 13:
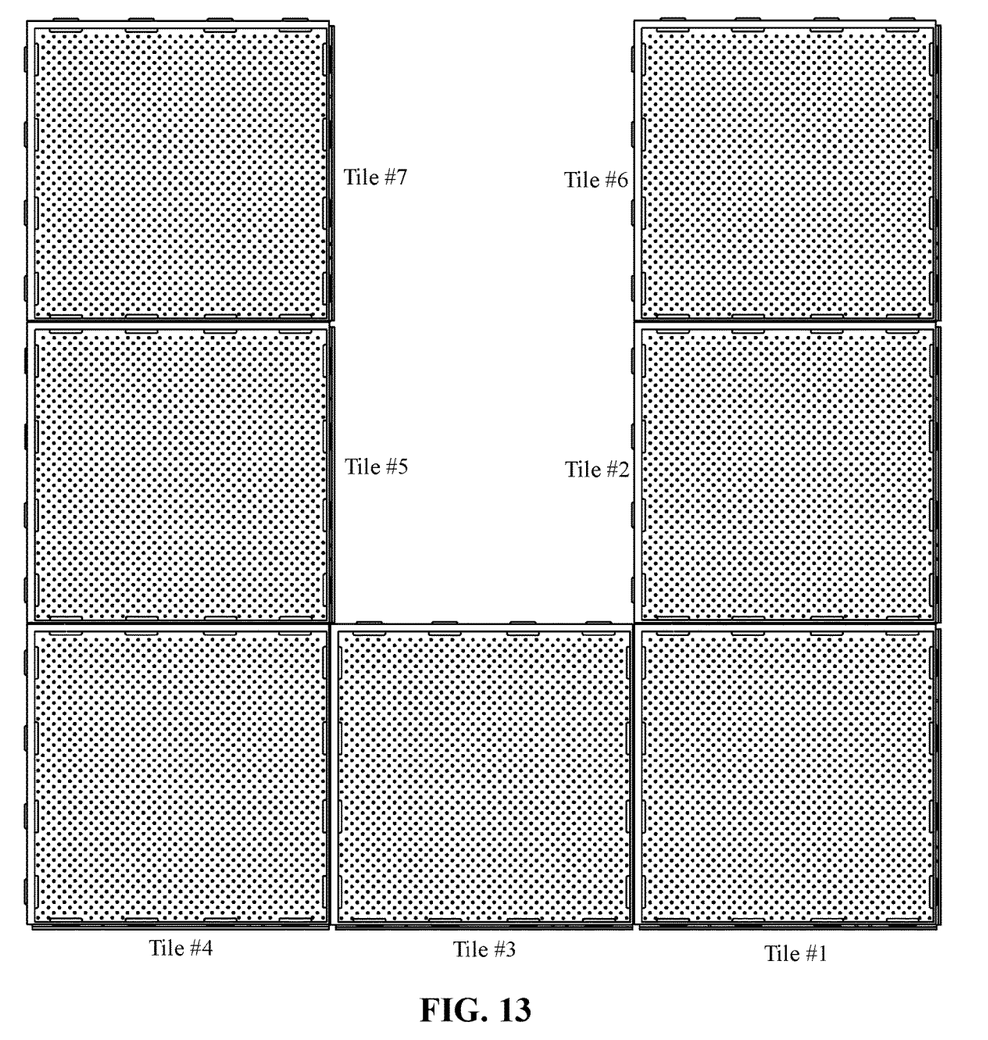
FIG. 13 is the top view of the cat litter mat tile of FIG. 1, shown interlocked with a second such mat tile, and a third such mat tile, and with the third mat tile interlocked with a fourth such mat tile, and with the fourth tile interlocked with a fifth mat tile, and with each of the second and fifth mat tiles respectively interlocked with sixth and seventh mat tiles to form an interlocked U-shaped tile assembly of seven tiles.

As seen in FIG. 13, five or more of the cat litter mat tiles 100 may be joined to form an interlocked U-shaped tile assembly, such that the primary male interlocking edge structure on the first side of the first tile is interlocked with the primary female interlocking edge structure on the second side of the second tile; the primary male interlocking edge structure on the third side of the first tile is interlocked with the primary female interlocking edge structure on the fourth side of a third tile; the primary male interlocking edge structure on the third side of the third tile is interlocked with the primary female interlocking edge structure on the fourth side of a fourth tile, and the primary male interlocking edge structure on the first side of the fourth tile is interlocked with the primary female interlocking edge structure on the second side of a fifth tile.

While illustrative implementations of one or more embodiments of the disclosed mat tile are provided hereinabove, those skilled in the art and having the benefit of the present disclosure will appreciate that further embodiments may be implemented with various changes within the scope of the disclosed mat tile. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A cat litter mat tile, said cat litter mat tile configured to redundantly interconnect with one or more other said cat litter mat tiles to form a mat assembly customizable for a particular cat litter box arrangement, for use in collecting cat litter grains dropped and/or dislodged from a cat paw when exiting from a cat litter box in one or more different directions according to the particular cat litter box arrangement, said cat litter mat tile comprising:

a base, said base comprising a rectangular shape with a top surface and bottom surface that extend from a first side to a second side, and from a third side to a fourth side; said first side being substantially parallel to said second side; said third side being substantially parallel to said fourth side, and substantially perpendicular to said first side;

a first peripheral wall configured to protrude substantially perpendicularly away from said base at said first side; a second peripheral wall configured to protrude substantially perpendicularly away from said base at said second side, and to connect to and extend away from said first peripheral wall; a third peripheral wall configured to protrude substantially perpendicularly away from said base at said third side, and to connect to and extend away from said second peripheral wall; and a fourth peripheral wall configured to protrude substantially perpendicularly away from said base at said fourth side and to connect to and extend away from each of said first peripheral wall and said third peripheral wall; and wherein said connected first, second, third, and fourth peripheral walls are thereby configured to form an enclosure to retain dropped cat litter grains on said top surface of said base;

a plurality of prongs each configured to protrude substantially perpendicularly away from said top surface of said base to form a grid pattern of said prongs;

a primary male interconnecting edge structure respectively formed on each of said first and third peripheral walls, each said primary male interconnecting edge structure comprising: a first flange shaped to protrude perpendicularly from an entire length of a distal end of the respective peripheral wall, being distal from said base; and a second flange shaped to protrude perpendicularly from an entire length of a distal end of said first flange;

a primary female interconnecting edge structure respectively formed on each of said second and fourth peripheral walls, said primary female interconnecting edge structure comprising: a first flange shaped to protrude perpendicularly from an entire length of a proximal end of the respective peripheral wall, being proximal with respect to said base; and a second flange shaped to protrude perpendicularly from an entire length of a distal end of said first flange;

wherein said primary male interconnecting edge structure is configured to interconnect using a clearance fit with said primary female interconnecting edge structure of an adjacent tile to inhibit relative movement in a first direction;

a plurality of secondary male interconnecting edge structures respectively formed on each said second flange of each said primary male interconnecting edge structure, each of said secondary male interconnecting edge structures comprising: a secondary flange configured to protrude perpendicularly from the respective second flange;

a secondary female interconnecting edge structure on each of said second and fourth side walls, said secondary female interconnecting edge structure comprising an opening;

wherein a length of each said secondary male interconnecting edge structure is about one-fourth to about one-fifth of a linear length of the respective second flange, to limit an amount of interconnection force that is thereby attained;

wherein said secondary male interconnecting edge structure is configured to interconnect using a clearance fit with said secondary female interconnecting edge structure of the adjacent tile to inhibit relative movement therebetween in a second direction; and wherein said cat litter mat tile is formed of a flexible and resilient material.

2. The cat litter mat tile according to claim 1, further comprising: a plurality of thru-openings in at least said base, with one of said plurality of thru-openings positioned in proximity to each said primary male interconnecting edge structure to provide additional local flexibility of said tile.

3. The cat litter mat tile according to claim 2,
wherein said flexible and resilient material comprises an elastomeric material.

4. The cat litter mat tile according to claim 3,
wherein said clearance fit of said interconnection and said resilient material are configured to require less than one pound of force to pull apart said tile and the adjacent tile.

5. The cat litter mat tile according to claim 3,
wherein said clearance fit of said interconnection and said resilient material are configured to require about 1-2 pounds of force pull apart said tile and the adjacent tile.

6. The cat litter mat tile according to claim 3,
wherein said clearance fit of said interconnection and said resilient material are configured to require about 3-4 pounds of force to pull apart said tile and the adjacent tile.

7. The cat litter mat tile according to claim 3,
wherein said flexible and resilient material is a rubber material.

8. The cat litter mat tile according to claim 2, further comprising:
a plurality of tertiary female interconnecting edge structures, each said tertiary female interconnecting edge structure comprising: a pair of spaced apart flanges configured to protrude substantially perpendicularly from each said first flange of said primary female interconnecting edge structures;
a plurality of tertiary male interconnecting edge structures, each said tertiary male interconnecting edge structure comprising: a flange configured to protrude substantially perpendicularly from each said first flange of said primary male interconnecting edge structures; and
wherein each said tertiary male interconnecting edge structure is configured to interconnect with a correspondingly positioned tertiary female interconnecting edge structure of the adjacent tile to inhibit relative movement therebetween in a third direction.

9. The cat litter mat tile according to claim 8, wherein said first direction, said second direction, and said third direction are mutually perpendicular.

10. The cat litter mat tile according to claim 9, wherein said base, said plurality of prongs, said first, second, third, and fourth peripheral walls, said primary male interconnecting edge structure, said primary female interconnecting edge structure, said secondary male interconnecting edge structures, said secondary female interconnecting edge structures, said tertiary male interconnecting edge structures, and said tertiary female interconnecting edge structures, are integrally formed as one single unitary piece.

11. The cat litter mat tile according to claim 10, wherein a spacing between said prongs in said grid pattern comprises about $3/16$ of an inch.

12. The cat litter mat tile according to claim 11, wherein a height of said prongs is between $2/16^{th}$ of an inch and $3/16^{th}$ of an inch.

13. A cat litter mat tile, said cat litter mat tile configured to redundantly interconnect with one or more other said cat litter mat tiles to form a mat assembly customizable for a particular cat litter box arrangement, for use in collecting cat litter grains dropped and/or dislodged from a cat paw when exiting from a cat litter box, said cat litter mat tile comprising:

a base, said base comprising a rectangular shape with a top surface and bottom surface that extend from a first side to a second side, and from a third side to a fourth side; said first side being substantially parallel to said second side; said third side being substantially parallel to said fourth side, and substantially perpendicular to said first side;

a plurality of prongs each configured to protrude away from said top surface of said base to form a grid pattern of said prongs;

a wall configured to protrude substantially perpendicularly away from said base, and to extend away from said base at each of said first side, said second side, said third side, and said fourth side, to form a corresponding first peripheral wall section, a second peripheral wall section, a third peripheral wall section, and a fourth peripheral wall section, said wall thereby configured to form an enclosure to retain dropped cat litter grains on said top surface of said base;

a primary male interconnection structure formed on each of said first and third peripheral wall sections, respectively, said primary male interconnection structure comprising: a first flange shaped to protrude substantially perpendicularly from substantially an entire length of a distal end of the respective peripheral wall section, being distal from said base; and a second flange shaped to protrude substantially perpendicularly from substantially an entire length of a distal end of said first flange;

a primary female interconnection structure respectively formed on each of said second and fourth peripheral side walls, said primary female interconnection structure comprising: a first flange shaped to protrude substantially perpendicularly from substantially an entire length of a proximal end of the respective peripheral wall section, being proximal with respect to said base; and a second flange shaped to protrude substantially perpendicularly from substantially an entire length of a distal end of said first flange;

wherein said primary male interconnection structure is configured to interconnect using a clearance fit with said primary female interconnection structure of an adjacent tile, to inhibit relative movement in a first direction;

a plurality of secondary male interconnection structures respectively formed on each said second flange of each said primary male interconnection structure, each of said secondary male interconnection comprising: a secondary flange configured to protrude substantially perpendicularly from the respective second flange;

a plurality of secondary female interconnection structures on each of said second and fourth side walls, said secondary female interconnection structure comprising an opening; and wherein said secondary male interconnection structure is configured to interconnect using a clearance fit with said secondary female interconnection structure of the adjacent tile to inhibit relative movement therebetween in a second direction.

14. The cat litter mat tile according to claim 13, wherein a length of each said secondary male interconnection structures is about one-fourth of a length of the respective peripheral wall section.

\* \* \* \* \*